(12) United States Patent
Roy et al.

(10) Patent No.: US 12,082,321 B2
(45) Date of Patent: Sep. 3, 2024

(54) LED LAMP ARRANGEMENT WITH CONTROLLED POWER

(71) Applicant: Silicon Hill B.V., Amsterdam (NL)

(72) Inventors: Shounak Roy, Maarssenbroek (NL); Ramon Ferré Vila, Diemen (NL); Rosemary Richardson, Amsterdam (NL)

(73) Assignee: Silicon Hill B.V., Amsterdam (NL)

( * ) Notice: Subject to any disclaimer, the term of this patent is extended or adjusted under 35 U.S.C. 154(b) by 461 days.

(21) Appl. No.: 17/284,049

(22) PCT Filed: Oct. 24, 2019

(86) PCT No.: PCT/EP2019/079099
§ 371 (c)(1),
(2) Date: Apr. 9, 2021

(87) PCT Pub. No.: WO2020/084087
PCT Pub. Date: Apr. 30, 2020

(65) Prior Publication Data
US 2021/0385921 A1 Dec. 9, 2021

Related U.S. Application Data

(60) Provisional application No. 62/749,781, filed on Oct. 24, 2018.

(51) Int. Cl.
*H05B 45/3574* (2020.01)
*H05B 45/305* (2020.01)
*H05B 45/3725* (2020.01)

(52) U.S. Cl.
CPC ....... *H05B 45/3574* (2020.01); *H05B 45/305* (2020.01); *H05B 45/3725* (2020.01)

(58) Field of Classification Search
CPC .............. H05B 45/3574; H05B 45/305; H05B 45/3725
See application file for complete search history.

(56) References Cited

U.S. PATENT DOCUMENTS 7,420,335 B2 * 9/2008 Robinson ............... H05B 31/50
315/192
9,832,837 B2 11/2017 Segers et al.
(Continued)

FOREIGN PATENT DOCUMENTS

CN 1173963 A 2/1998
CN 102695341 A 9/2012
(Continued)

*Primary Examiner* — Metasebia T Retebo
(74) *Attorney, Agent, or Firm* — David P. Owen; Hoyng Rokh Monegier B.V.

(57) ABSTRACT

An LED lamp (1) for use in a luminaire (2), the LED lamp (1) comprising a plurality of LEDs (14) connected in a plurality of groups (15, 16); one or more rectifier circuits (10, 10a, 10b) adapted for rectifying an electrical current received from the luminaire (2) for supply to the LEDs (14); a first control circuit (24) adapted to estimate electrical current or electrical power received by or used by the LED lamp (1), and adapted to generate an output on the basis of the estimate; and a switching circuit (20) comprising a first switch (21) for switching the plurality of groups of LEDs (15, 16) between a plurality of different circuit configurations at a switching frequency of at least 300 kHz and according to a duty cycle; wherein the switching circuit (20) is configured to adjust the duty cycle in dependence on the output of the first control circuit (24) to adjust the electrical power used by the LED lamp (1).

24 Claims, 5 Drawing Sheets

(56) References Cited

U.S. PATENT DOCUMENTS

| | | | |
|---|---|---|---|
| 10,342,079 | B1 | 7/2019 | Roy et al. |
| 2013/0313973 | A1 | 11/2013 | DeNicholas et al. |
| 2015/0181661 | A1 | 6/2015 | Hsia et al. |
| 2017/0027028 | A1* | 1/2017 | Segers ............... H05B 45/3578 |
| 2017/0370534 | A1 | 12/2017 | Xiong et al. |

FOREIGN PATENT DOCUMENTS

| | | |
|---|---|---|
| CN | 106804080 A | 6/2017 |
| CN | 108366469 A | 8/2018 |
| DE | 102014104548 A1 | 10/2015 |
| EP | 2838321 A1 | 2/2015 |
| WO | WO-2013024389 A1 * | 2/2013 ......... H05B 33/0803 |
| WO | 2015044311 A1 | 4/2015 |
| WO | 2016049671 A1 | 4/2016 |
| WO | 2016151109 A1 | 9/2016 |
| WO | 2016178727 A1 | 11/2016 |

* cited by examiner

LED LAMP ARRANGEMENT WITH CONTROLLED POWER

TECHNICAL FIELD

The invention relates generally to light emitting diode (LED) lamps and LED lighting, and more particularly to LED lamps suitable to replace a fluorescent lamp in a luminaire having a ballast for use with fluorescent lamps.

BACKGROUND

Fluorescent lighting has been around for many years. This form of lighting started out as a highly efficient alternative for incandescent light bulbs, but has recently been surpassed by LED lighting in terms of efficiency and power consumption, and also in other aspects as set out below.

Fluorescent lamps generally comprise a tube filled with an inert gas and a small amount of mercury, capped at both ends with double pinned end caps. The end caps contain a glow wire to preheat the gasses inside the tube and to vaporize the mercury in order to assist with ignition of the fluorescent lamp. After the user turns on a main switch (e.g. a wall switch or a cord switch on the ceiling), the fluorescent lamp is ignited, and heat generated by the conducted current keeps the fluorescent lamp in operational condition. To facilitate starting of the lamp and to limit current through the lamp during operation, and thus limit the power consumed, a ballast is usually fitted in the fluorescent luminaire, connected between the mains power supply and the fluorescent lamp, and power is supplied to the lamp via the ballast.

When first introduced, the only available ballasts were simple inductive or reactive elements placed in series with the power supply to the fluorescent lamp, which limit consumed power by limiting the AC current as a result of the frequency dependent impedance of the inductor. An undesirable result is a relatively low power factor and relatively high reactive power. These types of ballasts are usually referred to as magnetic ballasts. More recently other types of ballasts have been introduced, such as electronic ballasts. These ballasts usually first convert AC mains power into DC power, and subsequently convert the DC power into high frequency AC power to drive the fluorescent lamp.

Electronic ballasts can further be categorized into two types: constant current ballasts and constant power ballasts. Most electronic ballasts are constant current ballasts, designed to deliver current at a substantially constant amplitude. These ballasts can be modelled as a constant AC current source. These ballasts typically comprise a self-protection/self-correcting mechanism to avoid potential problems of maintaining a constant current. A constant power ballast is designed to deliver substantially constant power and the output current will vary depending on the load to try to maintain the design power output. If the operating power is below the design output level, constant power ballasts usually try to increase the output current to come closer to the design power level.

LED lamps are more efficient than fluorescent lamps, and have many other advantages. For example, no mercury is required for LED lamps, the light output from LED lamps is more directional, power can be more easily control or regulated, and the lifetime of LEDs is generally much longer than fluorescent lamps. Thus, replacing fluorescent lamps with LED lamps is often desirable, and it is also desirable to be able to fit replacement LED lamps into existing luminaires designed for fluorescent lamps without needing to modify the luminaire. However, an LED lamp typically operates differently when used with different types of ballasts. In some cases, a straightforward replacement of a florescent lamp by an LED lamp in a fluorescent luminaire results in a failure of the entire luminaire.

An LED lamp arrangement compatible with all three types of ballasts mentioned above (magnetic ballasts, constant current ballast, and constant power ballast) is described in applicant's U.S. Pat. No. 9,832,837, herewith incorporated by reference in its entirety. This lamp arrangement comprises a plurality of LEDs arranged in a plurality of groups switchable between serial connection and parallel connection, depending on whether the ballast is a magnetic ballast or an electronic ballast, and further comprises an inductive element and a switch which can be closed to short the inductive element, depending on whether the electronic ballast is a constant power ballast or a constant current ballast.

Recently, there is an increasing demand for a universal LED lamp which can be fitted into fluorescent luminaires regardless of the type of ballast in the luminaire, and also fitted into luminaires without any ballast. Such a luminaire may for example be a luminaire which was originally designed for a fluorescent lamp, but its ballast has been removed. This can happen for example when the ballast is too old and/or is damaged after years of operation. In such cases, many users want to get rid of the ballast but still want to keep the luminaire, or install a new luminaire without any ballast. Such a universal LED lamp can be installed in a luminaire without needing to determine whether there is a ballast in the luminaire or what type of the ballast is in the luminaire, enabling the manufacture and stocking of a single design of LED lamp suitable for use in any fluorescent luminaire. An example of such a universal LED lamp is disclosed in applicant's U.S. Pat. No. 10,342,079, herewith incorporated by reference in its entirety.

A problem of existing LED lamps is a lack of good power regulation. Constant power ballasts are designed for driving fluorescent lamps which consume more power than LED lamps, and thus will tend to drive an LED lamp at a relatively higher power. Different models of existing constant current ballasts can also drive the same LED lamp at quite different power levels. FIG. 1 shows a graph of power output by a variety of different makes and models of ballasts on the market, including a large number of electronic ballasts and a small number of magnetic ballasts. The graph shows ballast power output (i.e. the LED lamp input power) on the horizontal axis and the number of different makes and models of ballasts which output that power when driving an exemplary LED lamp without power regulation means on the vertical axis.

As shown in FIG. 1, the power output for electronic ballasts varies widely when driving the same LED lamp, some ballasts outputting low power at around 20 W or lower, while the majority output between 30 W and 40 W. The electronic ballasts with higher output power, some above 40 W, are generally constant power ballasts. This wide variation in ballast output power results in a corresponding variation in light output by the LED lamp when the LED lamp is installed into luminaires with different makes and models of ballasts. This situation is undesirable for lamp manufacturers who may advertise an LED lamp as having a certain light output, and for users who expect the same LED lamp to produce the same amount of light regardless of the design of luminaire into which the lamp is installed.

SUMMARY OF THE INVENTION

It is therefore an object of the invention to provide an LED lamp which has a more stable lamp power consumption, i.e. with a light output less dependent on the make or model of ballast used.

In one aspect, the invention relates to an LED lamp for use in a luminaire, the LED lamp comprising a plurality of LEDs connected in a plurality of groups, one or more rectifier circuits adapted for rectifying an electrical current received from the luminaire for supply to the LEDs, a first control circuit adapted to estimate electrical current or electrical power received by or used by the LED lamp, and adapted to generate an output on the basis of the estimate, and a switching circuit comprising a first switch for switching the plurality of groups of LEDs between a plurality of different circuit configurations at a switching frequency of at least 300 kHz and according to a duty cycle. The switching circuit is configured to adjust the duty cycle in dependence on the output of the first control circuit to adjust the electrical power used by the LED lamp. By switching between the plurality of different circuit configurations of the LEDs, the connections of the groups of LEDs into the circuit of the LED lamp are changed.

The switching circuit may be configured to adjust the duty cycle to substantially maintain a power output of the plurality of LEDs at a predetermined level. By changing the duty cycle, the LED lamp can adapt the average power consumed by the LED lamp, to achieve a substantially stable and predictable lamp power consumption and light output irrespective of the make or model of ballast used to supply power to the LED lamp.

The first control circuit may comprise a microprocessor or microcontroller executing code for determining the output for adjusting the duty cycle. The first control circuit may implement an algorithm or formula to control the switching of switching circuit to produce a certain predetermined power consumption of LED lamp. In one embodiment, first control circuit calculates the output for adjusting the duty cycle using a substantially straight-line relation between current flowing through the LEDs and the duty cycle in percent. The first control circuit may be adapted to calculate the output for adjusting the duty cycle by implementing a relation $D=mA+c$, where D is proportional to the duty cycle, A is proportional to the electrical current flowing though the LEDs, and m and c are coefficients having predetermined values. The values of the coefficients m and c vary in dependence on the configuration of the LED lamp, and may be determined empirically. In particular, the values of m and c depend on the number of LEDs and division of the LEDs in the plurality of groups.

The plurality of groups of LEDs may include a first group of LEDs and a second group of LEDs connected in series, with the first switch connected in parallel with the second group of LEDs. In this configuration, when the first switch is closed, the second group of LEDs is bypassed (i.e. substantially short-circuited) by the first switch. When the first switch is open, electrical current from the rectifier circuit(s) flows through both groups of LEDs, and when the first switch is closed, the electrical current flows through the first switch and the first group of LEDs. The second group of LEDs is bypassed so that little or substantially no current flows through the second group of LEDs.

The LED lamp may further comprise an inductive element connected to receive an input electrical current from the luminaire for supply to the LEDs, and a second switch connected to bypass the inductive element when the received input current from the luminaire is below a predetermined threshold. The second switch may be controlled by a second control circuit adapted to measure an electrical current received by LED lamp from the luminaire or electrical current flowing in the LED lamp, and control the second switch on the basis of the measurement. The second control circuit may be adapted to close the second switch if an electrical current received by LED lamp or flowing through the LED lamp is below a predetermined threshold, to bypass (i.e. short-circuit) the inductive element, and open second switch when at or above the predetermined threshold. This increases the input impedance of the LED lamp when operating with a constant-power electronic ballast, and not increasing the input impedance in other situations. The inductive element may be connected to receive an electrical current from the luminaire before rectification, for example the inductive element may be connected in series between one of the connector pins of the LED lamp and one of the rectifier circuits. The inductive element may have an inductance in a range of 200 μH to 500 μH.

The LED lamp may further comprise a switched-mode power supply electrically connected to receive a rectified current from one or more of the rectifiers and generate a switched DC output current suitable for driving the LEDs, and a frequency detection circuit adapted to detect the frequency of a voltage or current supplied to LED lamp from the luminaire and generate an output, or a voltage detection circuit adapted to detect a voltage supplied to LED lamp from the luminaire. The LED lamp may be adapted to disconnect or disable or deactivate the switching circuit and connect or enable or activate the switched-mode power supply for driving the LEDs on the basis of the output of the frequency detection circuit or the voltage detection circuit.

The LED lamp may comprise a third switch connected in series with one of the groups of LEDs, wherein the said one group of LEDs is disconnected from the output of the rectifiers when third switch is open. The third switch may also disconnect the switching circuit from the output of the rectifiers when the third switch is open.

BRIEF DESCRIPTION OF THE DRAWINGS

The advantages of the invention will be apparent upon consideration of the following detailed disclosure of exemplary non-limiting embodiments of the invention, especially when taken in conjunction with the accompanying drawings wherein.

DESCRIPTION OF ILLUSTRATIVE EMBODIMENTS

Figure 2:
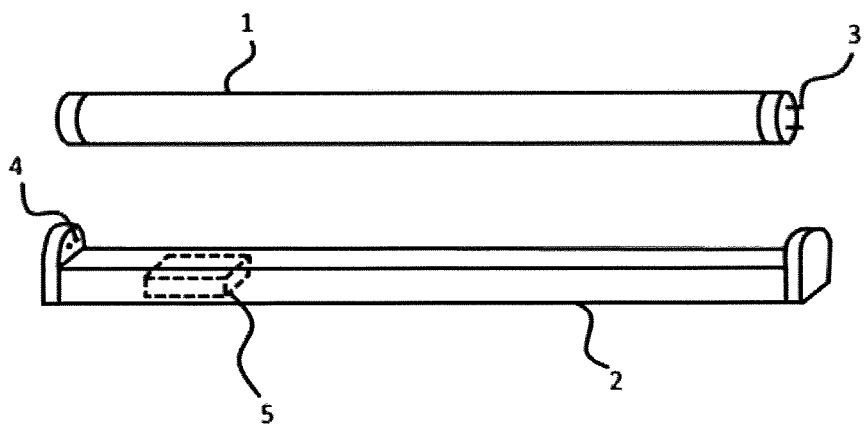
FIG. 2 is a diagram of an LED lamp and luminaire.

The following is a more detailed explanation of exemplary embodiments of the invention. FIG. 2 shows an LED lamp 1 adapted for installation in a luminaire 2 designed for a fluorescent tube, the LED lamp 1 preferably having a size and shape to enable installation into the luminaire 2 without modification. Two electrical connectors 3 (usually in the form of pins) are provided at each end of the LED lamp 1, for releasably connecting to corresponding connectors 4 of the luminaire. The luminaire 2 may include a ballast 5 or may have no ballast. The ballast 5, if included in the luminaire, may be a magnetic ballast, an electronic ballast which operates as a constant current ballast, or an electronic ballast which operates as a constant power ballast.

The luminaire 2 provides electrical power to the LED lamp 1 via the connectors 4. The electrical power provided by the luminaire 2 which is input to the LED lamp 1 will vary depending on the design of the luminaire, i.e. whether the luminaire has a ballast and if so, what type of ballast.

The luminaire 1 may have no ballast. This type of luminaire typically provides AC mains voltage at the connectors 4, e.g. 120 Vac or 230 Vac at 50 Hz or 60 Hz. This is referred to as "direct mains", although the luminaire may include some electrical circuit components between the AC main input and the luminaire's connectors 4.

The luminaire 2 may be fitted with a magnetic ballast, which regulates the electrical current supplied to the luminaire using an inductive element, typically providing electrical power at the connectors 4 at mains frequency and voltage similar to the direct mains case.

The luminaire 2 may be fitted with an electronic ballast, which typically converts AC mains voltage power to DC and then back to a variable frequency AC voltage, providing a high frequency electrical power at the connectors 4, e.g. 100-110 Vac at a frequency in the range from 20 kHz to 70 kHz. Electronic ballasts are generally designed as constant-current ballasts designed to supply electrical current at a substantially constant amplitude, or constant-power ballasts designed to deliver substantially constant power and whose output current will vary depending on the load impedance to attempt to maintain the design power output. If the load voltage (e.g. across the LED lamp 1) is below the expected fluorescent lamp voltage, constant power ballasts usually try to increase the output current to come closer to the design power level.

Figure 3:
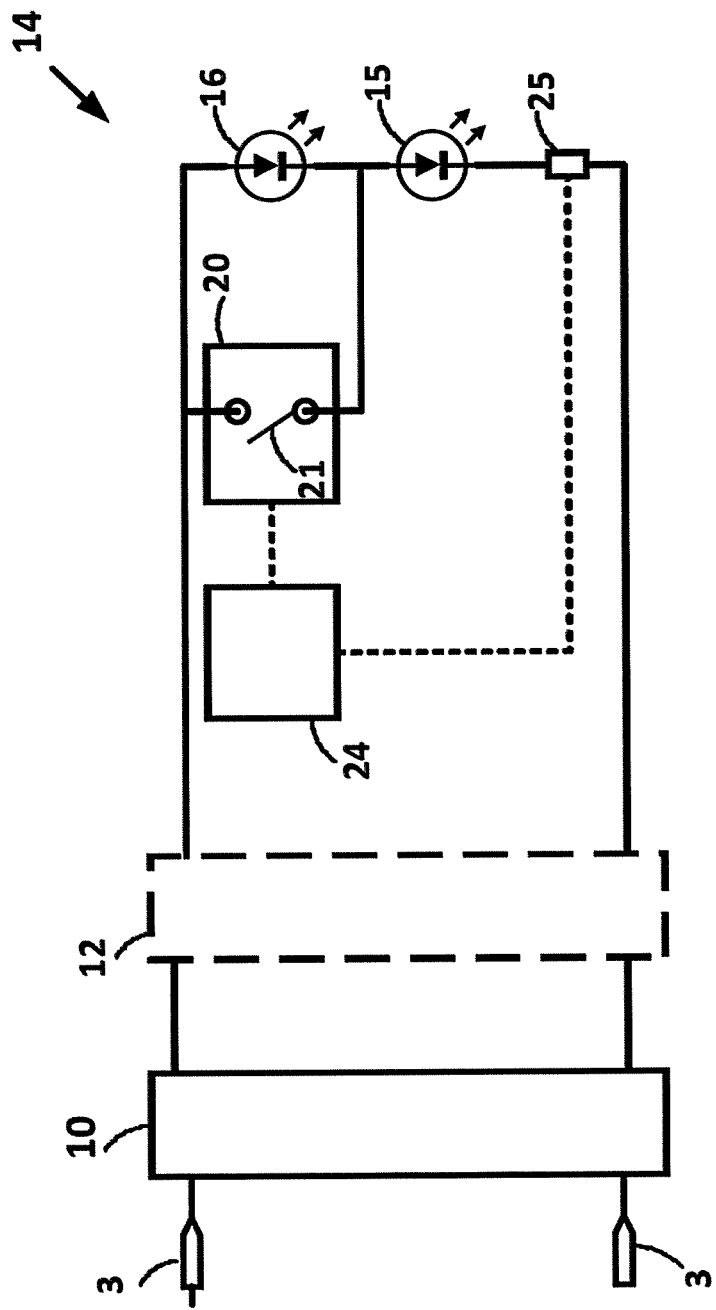
FIG. 3 is a simplified block diagram of an embodiment of an LED lamp including a first switching circuit for power regulation.

FIG. 3 shows a simplified block diagram an embodiment of the LED lamp 1 according to the invention. In this embodiment, the LED lamp 1 comprises a plurality of connector pins 3 for receiving electrical power from luminaire 2. The connector pins 3 are electrically coupled to a rectifier circuit 10 which is adapted to rectify the electrical voltage and current received by the connector pins 3. The output of rectifier circuit 10 is electrically coupled to an optional filter circuit 12, and to a switching circuit 20 (via the filter circuit 12 if included). The switching circuit 20 comprises a first switch 21.

Figure 6:
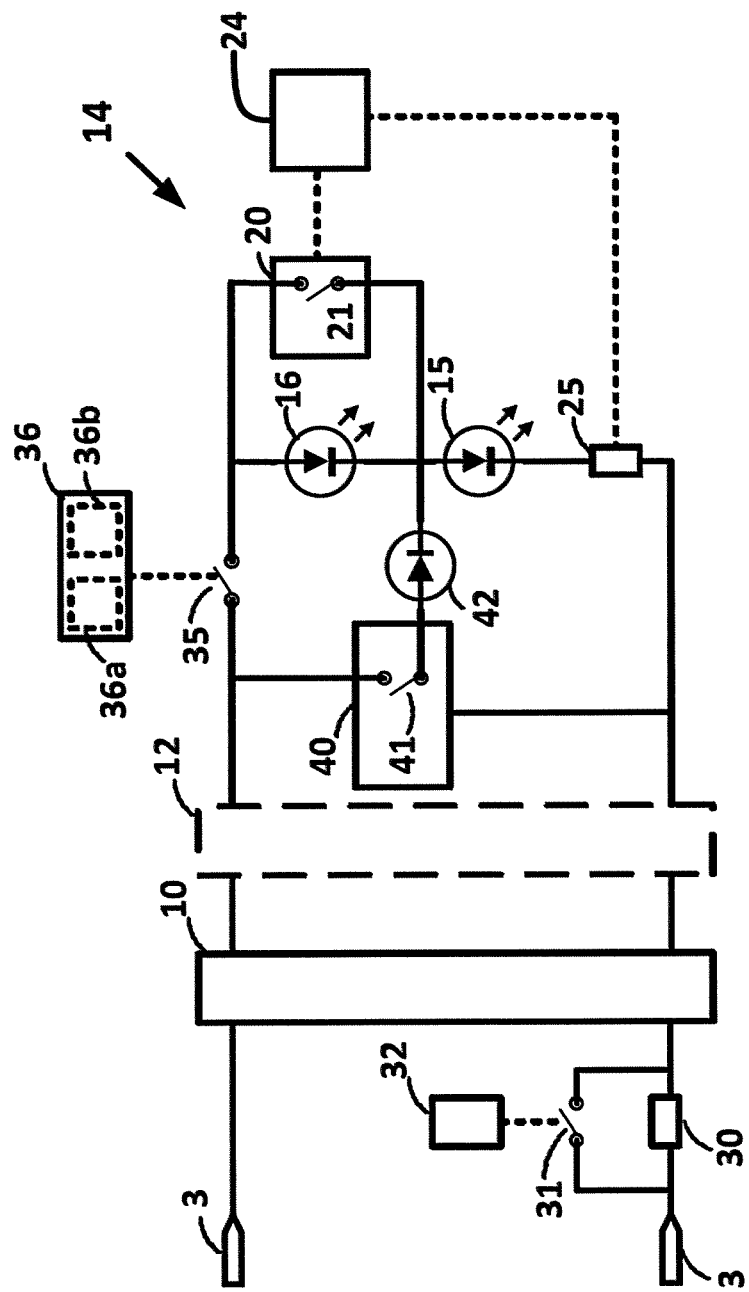
FIG. 6 is a simplified block diagram of a further variation of the LED lamp including a switched-mode power supply.

The optional filter circuit 12 may be an EMI filter, i.e. a filter for reducing the electromagnetic interference (EMI) generated by switching circuit 20 (and switched-mode power supply 40 in the embodiment of FIG. 6). Applicant's U.S. Pat. No. 10,342,079, which is incorporated herein by reference, describes an example of a filter circuit which may be implemented in LED lamp 1.

In some embodiments, the switching circuit 20 may comprise a switched mode power supply, which may be of conventional design for converting the rectified DC supply from rectifier circuit 10 to generate a switched DC output suitable for driving LEDs 14. In the embodiment shown in FIG. 4, the switching circuit 20 comprises the first switch 21 with inductor 27 connected in series with the first switch 21 and the first group of LEDs 15, and a diode 28 and capacitor 29 connected in parallel with the first group of LEDs 15. Many different configurations may be used for the switching circuit 20 as will be appreciated by the skilled person.

The LED lamp 1 includes a plurality of LEDs 14 electrically coupled to an output of rectifier 10 to receive electrical current output by the rectifier 10. In this embodiment, the LEDs 14 are arranged in two groups, i.e. a first group of LEDs 15 and second group of LEDs 16. The first switch 21 operates to switch the LEDs 14 between two different circuit configurations in which the two groups of LEDs 15, 16 are connected differently into the circuit of the LED lamp 1. In this embodiment, the first group of LEDs 15 and the second group of LEDs 16 are connected in series, and the first switch 21 is connected in parallel with the second group of LEDs 16. When the first switch 21 is open, the LEDs 14 are connected in a first circuit configuration with the second group of LEDs 16 not bypassed and the electrical current output by the rectifier 10 flows through both groups of LEDs 15, 16 in series. When the first switch 21 is closed, the LEDs 14 are connected in a second circuit configuration with the second group of LEDs 16 being bypassed (i.e. substantially short-circuited) by the first switch 21 so that the electrical current output by the rectifier 10 flows through the first switch 21 and first group of LEDs 15, bypassing the second group of LEDs 16 so that little or substantially no current flows through the second group of LEDs 16.

Thus, in the present embodiment, in the first circuit configuration when the first switch 21 is closed, substantially all of the electrical current from the rectifier 10 passes through the first group of LEDs 15 and not through the second group of LEDs 16, so that the LED lamp consumes a relatively lower power. In the second circuit configuration when the first switch 21 is open, substantially all of the electrical current from the rectifier 10 passes through both the first and second groups of LEDs 15, 16, so that the LED lamp consumes a relatively higher power. Switching the circuit configuration of the groups of LEDs provides control of lamp power most effectively when operating with constant-current electronic ballasts, but nevertheless also enables control of lamp power for constant-power electronic ballasts.

Although the present embodiment includes two groups of LEDs connected in series, the LED lamp 1 may include three or more groups of LEDs and/or the interconnection of the groups of LEDs may be different, and the number of LEDs in each group may be the same or may differ among the groups. Furthermore, although the present embodiment includes a first switch 21 connected in parallel with one of the groups of LEDs, the first switch 21 may be connected in different ways to define different circuit configurations of the groups of LEDs, and/or the LED lamp 1 may include more than one switch for altering the configuration of the groups of LEDs. For example, the LED lamp 1 may comprise two or more groups of LEDs connected in parallel, with the first switch 21 connected in series with one of the groups of LEDs having a different number of LEDs than one or more of the other groups of LEDs.

The first control circuit 24 is adapted to estimate the electrical current, voltage or power received by or used by the LED lamp 1, and is adapted to generate an output on the basis of the estimate for controlling the switching circuit 20 to switch the first switch 21. The estimate may be derived, for example, by measuring an electrical current or voltage and the measurement used as an input to the first control circuit 24. The measurement may be made at a various locations in the circuit of the LED lamp 1, for example at an input to the rectifier 10, at an output of the rectifier 10, in series with the LEDs 14, etc. In the embodiment shown in FIG. 3, a sensor element 25 is connected in series with the LEDs 14 for measuring the electrical current flowing through the LEDs 14. The sensor element 25 may be, for example, a resistor across which a voltage is measured to derive an input for first control circuit 24.

The switching circuit 20 is adapted to control the first switch 21 to open and close the switch at a certain frequency and at a certain duty cycle. In this embodiment, switching circuit 20 is adapted to switch the first switch 21 at a high frequency, preferably at 300 kHz or higher. A suitable range is from 300 kHz to 1 MHz, although the frequency may be even higher. Electronic ballasts typically provide an output in the range 40 kHz to 60 kHz, and the switching frequency of first switch 21 is preferably above this range and sufficiently high that it does not disturb the operation of an electronic ballast, particularly where the ballast includes a sensing mechanism which may result in the ballast performing an unnecessary shutdown if the LED lamp does not behave like a fluorescent tube.

The term duty cycle as used herein refers to the fraction of each cycle of opening and closing the first switch 21 during which fraction the first switch 21 is closed. In other words, a 100% duty cycle refers to the situation where the first switch 21 is constantly closed (so that the second group of LEDs 16 is always bypassed), and a 0% duty cycle refers to the situation where the first switch 21 is constantly open (so that the second group of LEDs 16 is never bypassed). The switching circuit 20 is configured to adjust the duty cycle in dependence on the output of the first control circuit 24 to adjust the power consumed or used by the LED lamp 1. The switching circuit 20 may be configured to also adjust the switching frequency of the first switch 21 in dependence on the output of the first control circuit 24.

By changing the duty cycle, the LED lamp 1 can adapt the average power consumed by the LED lamp 1, thereby achieving the desired lamp power level. In this way, the LED lamp 1 can have a substantially stable and predictable lamp power consumption and light output irrespective of the make or model of ballast used to supply power to the LED lamp 1.

The first control circuit 24 may comprise logic to calculate how the duty cycle should be adjusted based e.g. on the output of sensor element 25. The first control circuit 24 may be implemented using hardwired logic or hardware in combination with software, for example using an ASIC, FPGA, microprocessor, microcontroller or other suitable means. In one embodiment, first control circuit 24 implements an algorithm or formula to control the switching of switching circuit 20 to produce a certain predetermined power consumption of LED lamp 1, to achieve regulation of the lamp power. The first control circuit 24 and switching circuit 20 may be separate components or may be integrated in a single component.

In one embodiment, the first control circuit 24 receives an input from sensor element 25 which is proportional to the electrical current flowing though the LEDs 14, and first control circuit 24 provides an output indicative of a duty cycle for the first switch 21.

In one embodiment, first control circuit 24 calculates the output for adjusting the duty cycle using a substantially straight-line relation between current flowing through the LEDs 14 and the duty cycle in percent. The first control circuit 24 may be adapted to calculate the output for adjusting the duty cycle by implementing a relation $D=mA+c$, where D is proportional to the duty cycle, A is proportional to the electrical current flowing though the LEDs 14, and m and c are coefficients having predetermined values. The values of the coefficients m and c vary in dependence on the configuration of the LED lamp, and may be determined empirically. In particular, the values of m and c depend on the number of LEDs 14 and division of the LEDs in the plurality of groups 15, 16. A part of the above relation represents the contribution of the fixed portion of the lamp circuit (e.g. the first group of LEDs 15) and the remaining part represents the contribution of the variable portion of the lamp circuit (e.g. the second group of LEDs 16 which are cycled on and off).

In one exemplary embodiment, the LED lamp 1 comprises twenty-four LEDs 14 divided into a first group of LEDs 15 having sixteen LEDs and second group of LEDs 16 having eight LEDs. In this embodiment, the first control circuit 24 is adapted to implement the relation $D=0.63 A-224$, where D is the duty cycle as a percentage, A is the mean current flowing though the LEDs 14 in mA. For example, if the mean current is measured at 430 mA, then the duty cycle $D=40$, i.e. the control circuit 24 will generate an output to set the duty cycle to 40%. In another exemplary embodiment, the LED lamp 1 comprises twenty-four LEDs 14 divided into first and second groups each having twelve LEDs. In this embodiment, the above relation becomes $D=0.56 A-198$. Using the same example of a measured current of 430 mA, the control circuit 24 will generate an output to set the duty cycle to 37%. For other configurations of the LED groups, the values of the coefficients m and c may be calculated by linear interpolation.

The values of the coefficients m and c in the above exemplary embodiment when used in the above relation are suitable for use with blue-pumped white LEDs (i.e. phosphor-converted white LEDs with a blue LED pump) and at switching frequencies around 500 kHz. The values of the coefficients m and c may be adjusted for variations in the switching frequency, or for use with different LEDs, using empirical methods.

In another embodiment, the first control circuit 24 implements a look-up table, which comprises measured values with corresponding duty cycle. The lookup table may comprise a series of values stored in memory, or may be contained in the software code (e.g. as a series of if-then statements in the code).

The control circuit 24 may be configured to periodically read the input and calculate the corresponding duty cycle, e.g. every 40 ms, to enable continuous monitoring and adapting of the duty cycle to achieve stable regulation of the lamp power.

Figure 4:
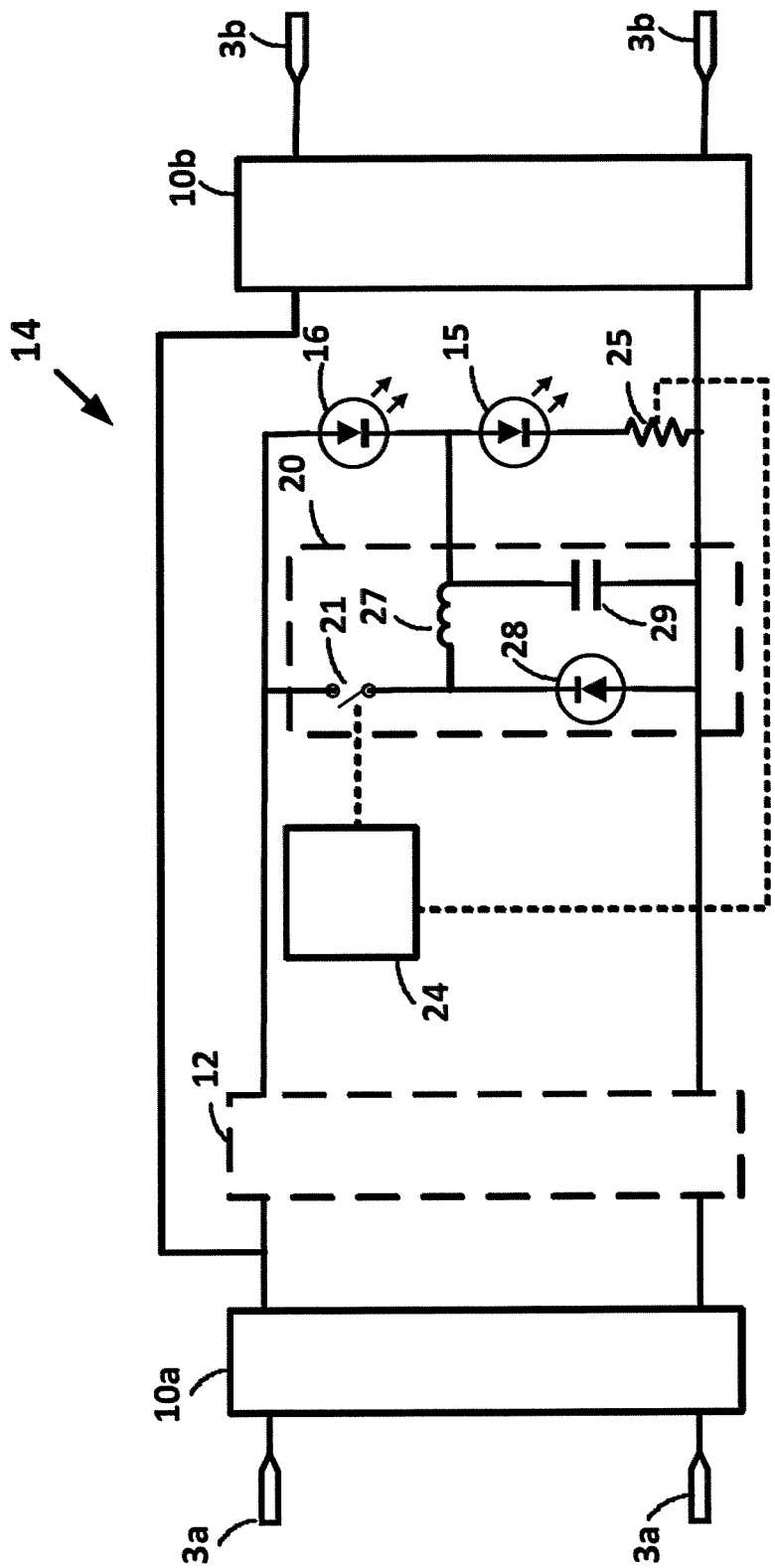
FIG. 4 is a simplified block diagram of a two-ended version of the LED lamp.

The inventor performed experiments with an LED lamp 1 constructed in accordance with the embodiment shown in FIG. 4, with the switching circuit 20 operating at a switching frequency of 500 kHz, when powered by three different commercially available constant-current electronic ballasts. The output voltage and output current of the ballast was measured to calculate the input power to the lamp, and the first control circuit 24 was configured to adjust the duty cycle of the switching circuit 20 to achieve a lamp power of approximately 25 W. The resulting duty cycle at which the switching circuit 20 operated was noted. The results are shown in Table 1 below, indicating that the LED lamp 1 operated successfully at a lamp power consumption of close to designed 25 W:

TABLE 1

| Ballast | Lamp power (W) | $V_{out}$ ($V_{rms}$) | $I_{out}$ ($I_{rms}$) | Duty cycle |
|---|---|---|---|---|
| Osram QTP8 1 × 58 | 25 | 55.2 | 0.666 | 32% |
| Osram QTP 1 × 58/230-240 | 24.4 | 57.9 | 0.622 | 25% |
| Tridonic PCA 1/58 EXCEL one4all | 24.8 | 75.2 | 0.371 | 7% |

FIG. 4 shows another embodiment of the LED lamp 1 of FIG. 3 in a two-ended configuration similar to a standard fluorescent tube and suitable for installation in a luminaire designed for a fluorescent tube. The LED lamp 1 comprises two sets of connector pins 3a, 3b and two rectifier circuits 10a, 10b, one set of connector pins and one rectifier circuit arranged at each end of the LED lamp 1. Note that all of the embodiments described may utilize a two-ended configuration with two sets of connector pins 3a, 3b and two rectifier circuits 10a, 10b as shown in FIG. 4.

Figure 5:
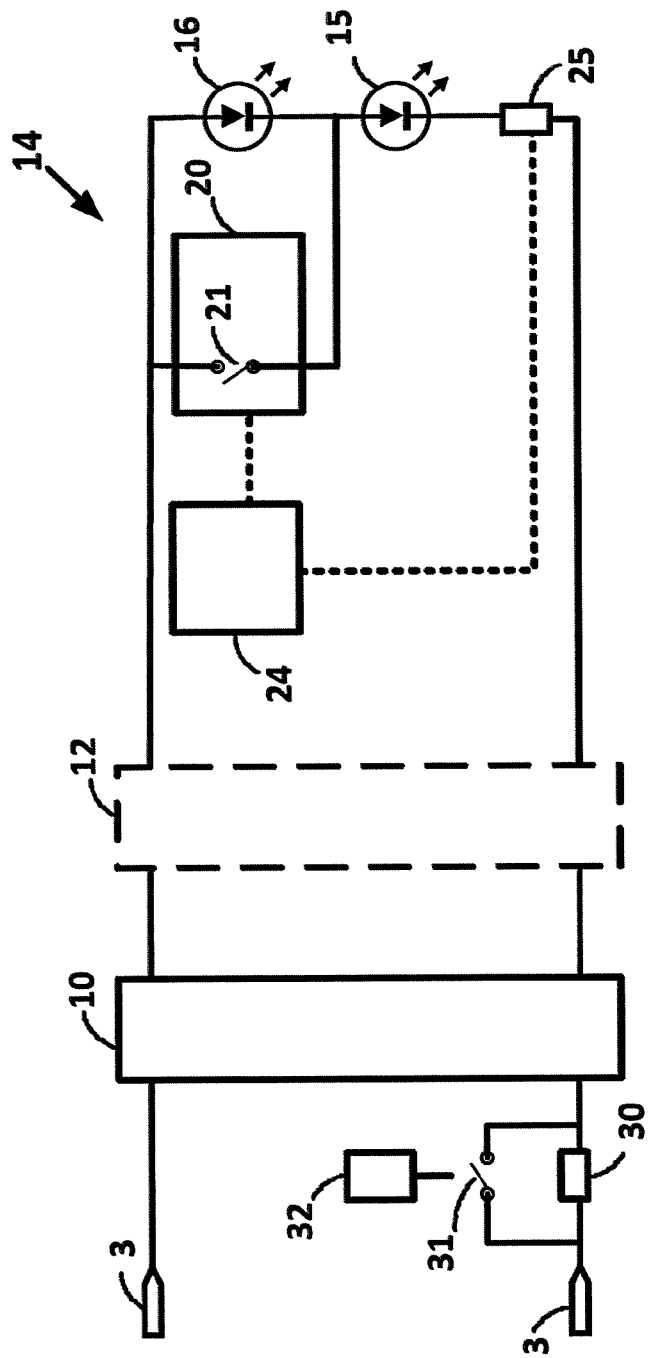
FIG. 5 is a simplified block diagram of a variation of the LED lamp including a switchable inductive element.

FIG. 5 shows a further embodiment of the LED lamp 1 of FIG. 3, comprising an inductive element 30 connected in series between one of the connector pins 3 and the rectifier circuit 10 (i.e. on the AC side of rectifier 10) and a second switch 31 connected across the inductive element 30. The second switch 31 is controlled by a second control circuit 32 adapted to measure electrical current received by LED lamp 1 from the luminaire 2 or electrical current flowing in the LED lamp 1.

A constant-power electronic ballast is designed to deliver substantially constant power and the output current will vary depending on the load to attempt to maintain the design power output. If the operating power is below the design power output, constant power ballasts usually try to increase the output current to come closer to the design power level. LED lamps are more efficient than fluorescent lamps, using less power to produce the same amount of light. Using a constant-power ballast to power an LED lamp may result in the ballast increasing its output current excessively to come closer to the design power level. This problem can be addressed by increasing the input impedance of the LED lamp 1 (i.e. the load impedance as viewed by the ballast), but a fixed high input impedance creates problems with many designs of constant-current electronic ballasts which include safety shutdown features which reject any load that does not behave like a fluorescent lamp.

The inductive element 30 and second switch 31 in this embodiment provides a means for increasing the input impedance of the LED lamp 1 if the electrical current supplied to or flowing in the LED lamp 1 reaches or exceeds a threshold, thus enabling the LED lamp 1 to have a variable input impedance.

In this embodiment, when the second control circuit 32 determines that an electrical current received by LED lamp 1 or flowing through the LED lamp 1 is below a predetermined threshold, the second switch 31 remains closed (it is preferably a normally-closed switch such as a relay, or the second control circuit 32 may open the second switch 31 if it is a normally-open switch) thereby bypassing (i.e. short-circuiting) the inductive element 30 so that there is no increase in the input impedance of the LED lamp 1. This state is suitable for operating the LED lamp 1 when installed in a luminaire 2 fitted with an electronic ballast of the constant-current type.

When the second control circuit 32 determines that the electrical current received by LED lamp 1 or flowing through the LED lamp 1 is at or above the predetermined threshold, the second control circuit 32 is adapted to open second switch 31 (or does not close the second switch 31 if it is normally-open switch) so that the electrical current from the luminaire passes through inductive element 30 which increases the input impedance of the LED lamp 1. This state is suitable for operating the LED lamp 1 when installed in a luminaire 2 fitted with an electronic ballast of the constant-power type.

Alternatively, the second switch 31 may be implemented as a fuse adapted to blow (become open-circuit) when the electrical current through the fuse exceeds a predetermined threshold, and the sensing circuit 32 may be omitted.

Preferably, the inductive element 30 has an inductance in a range of 200 μH to 500 μH. The inductive element 30 may be arranged on the DC side of the rectifier 10 (e.g. in series between an output of the rectifier circuit 10 and the LEDs 14), but preferably is arranged on the AC side of the rectifier 10. When used with a constant-power electronic ballast, the adjustment of duty cycle of first switch 21 has a limited effect on lamp power. However, the inclusion of the inductive element 30 which can be switched into the circuit when a constant-power ballast is used, together with the ability to adjust the duty cycle, enables improved regulation of power consumed by the LED lamp 1 at a lower power level even when the ballast is a constant-power ballast.

The inventor has performed similar experiments as described above, using the same parameters. Four different commercially available constant-power ballasts were tested with an LED lamp 1 constructed in accordance with the embodiment shown in FIG. 5. The inductive element 30 used for the experiments had an inductance of 470 μH. Other parameters were the same as the experiment described above. The results are shown in Table 2 below.

TABLE 2

| Ballast | Lamp power (W) | $V_{out}$ ($V_{rms}$) | $I_{out}$ ($I_{rms}$) | Duty cycle |
|---|---|---|---|---|
| Philips HF-E 158 TL-D | 25.5 | 72.5 | 0.536 | 80% |
| Detronic TJB-E158H | 25.3 | 98 | 0.38 | 5% |
| FIN FL A 158-1 | 26.6 | 72.4 | 0.562 | 80% |
| BAG BCS54.1FX-11/220-240 | 27.5 | 79.1 | 0.659 | 100% |

FIG. 6 shows another embodiment of LED lamp 1. This embodiment is similar to FIG. 5, with an addition of a third switch 35 controlled by a third control circuit 36, and a switched-mode power supply 40.

When LED lamp 1 is operated in a luminaire with an electronic ballast, the pin connectors 3 receive a high frequency AC voltage generated by the electronic ballast. When the electronic ballast is started, it first generates a high output voltage typically around 400 Vac designed to ignite a fluorescent lamp. After the ignition period the output voltage drops and is dependent on the load impedance, typically having a voltage lower than AC mains voltage, e.g. in the range from 40-80 Vac depending on the load, and having a frequency much higher than AC mains voltage, e.g. in the range from 20 kHz to 200 kHz.

When LED lamp 1 is operated in a direct mains luminaire (i.e. with no ballast), the pin connectors 3 typically receive AC mains voltage, and the output from the rectifier 10 is a pulsating DC voltage with maximum voltage typically close to 170 Vpk and 325 Vpk for 120 Vac and 230 Vac applications respectively, and a ripple frequency of twice the mains frequency, e.g. 100 Hz or 120 Hz (for full-wave rectification). When LED lamp 1 is installed in a luminaire with a magnetic ballast, the connectors 3 typically receive AC mains voltage modified by the inductive element in the ballast, and during steady-state operation the output from rectifiers 6 (preferably full-wave rectifiers) is a pulsating DC voltage similar to the situation with no ballast.

When the LED lamp 1 is operated in a direct mains luminaire or with a magnetic ballast, the power regulation provided by switching circuit 20 and first switch 21 is typically not needed. In this operating mode, the switching circuit 20 is disconnected or disabled or deactivated, and one or more of the groups of LEDs 15, 16 are instead powered from a switched-mode power supply 40.

In the embodiment of FIG. 6, third switch 35 is connected in series with the second group of LEDs 16, so that when third switch 35 is open, the second group of LEDs 16 is disconnected from the output of rectifier 10. The third switch 35 also disconnects the switching circuit 20 from the output of the rectifier 10.

The third switch 35 is controlled by third control circuit 36, which may comprise a frequency detection circuit 36a adapted to detect the frequency of the voltage or current supplied to LED lamp 1 to distinguish an electronic ballast from a magnetic ballast or direct mains. For a magnetic ballast or direct mains the frequency of the AC voltage and current supplied to LED lamp 1 is substantially the mains frequency, e.g. 50 or 60 Hz, much lower than the typical output frequency of an electronic ballast, which is typically in the range of 20 to 200 kHz. If the third control circuit 36 detects a frequency at or above a predetermined threshold, e.g. 10 kHz, it closes third switch 35 to connect second group of LEDs 16 and switching circuit 20, suitable for operation with an electronic ballast. If the third control circuit 36 detects a frequency below the predetermined threshold, it opens third switch 35 to disconnect the second group of LEDs 16 and switching circuit 20, suitable for operation without a ballast or with a magnetic ballast.

Alternatively, third control circuit 36 may comprise a voltage detection circuit 36b adapted to detect the voltage supplied to LED lamp 1 to distinguish an electronic ballast from a magnetic ballast or direct mains, since the voltage typically supplied by a magnetic ballast or direct mains is significantly higher than the typical output voltage of an electronic ballast.

The switched-mode power supply 40 is electrically connected to the output of rectifier 10, via the optional filter circuit 12 if included, and the output of switched-mode power supply 40 is connected to the first group of LEDs 15. Switched-mode power supply 40 may be of conventional design for converting the rectified DC supply from rectifier 10 to generate a switched DC output suitable for driving the LEDs 14.

The switched-mode power supply 40 may be adapted to detect the voltage its input, or at the output of the rectifier 10 or filter circuit 12. If the detected voltage is at or below a predetermined threshold, e.g. 100V, then the switched-mode power supply 40 is disabled or disconnected or deactivated. The voltage detection circuit may be integrated into the switched-mode power supply 40 or may be a separate component. A diode 42 may be connected in series between the output of the switched-mode power supply 40 and the first group of LEDs 15 to block the flow of electrical current into the switched-mode power supply when operating with an electronic ballast. The application of a switched-mode power supply in an LED lamp is further described in Applicant's U.S. Pat. No. 10,342,079, which is incorporated herein by reference.

Thus, the embodiment of FIG. 6 may be operated in a luminaire with a constant-current or constant-power electronic ballast, a magnetic ballast, or no ballast. When the LED lamp 1 is operated with an electronic ballast, third switch 35 is closed by third control circuit 36 (which detects the supply frequency is above a threshold or supply voltage is below a threshold) and first switch 21 operates at a high switching frequency (e.g. 500 kHz) to switch between different circuit configurations of the groups of LEDs to provide regulation of the power, at a duty cycle calculated by control circuit 24 on the basis of an input from sensor element 25 (e.g. based on electrical current flowing through sensor element 25). The second switch 31 is closed when the electronic ballast is a constant-current ballast, and second switch 31 is open (so that electrical current from the ballast flows through inductive element 30) when the electronic ballast is a constant-power ballast to increase the input impedance of the LED lamp 1. The switched-mode power supply 40 is disabled or disconnected or deactivated when its input voltage or rectifier output voltage is detected below a threshold indicating the lamp is operating with an electronic ballast.

When the LED lamp 1 is operated with a magnetic ballast or direct mains, third switch 35 is opened by third control circuit 36 (which detects the supply frequency is below a threshold or supply voltage is above a threshold) and switching circuit 20 is disconnected or disabled or deactivated. The second switch 31 is closed, and the switched-mode power supply 40 is enabled or connected or activated when its input voltage or rectifier output voltage is detected at or above a threshold indicating the lamp is operating with direct mains or a magnetic ballast. The switched-mode power supply 40 generates a switched DC output for driving the first group of LEDs 15.

Figure 1:
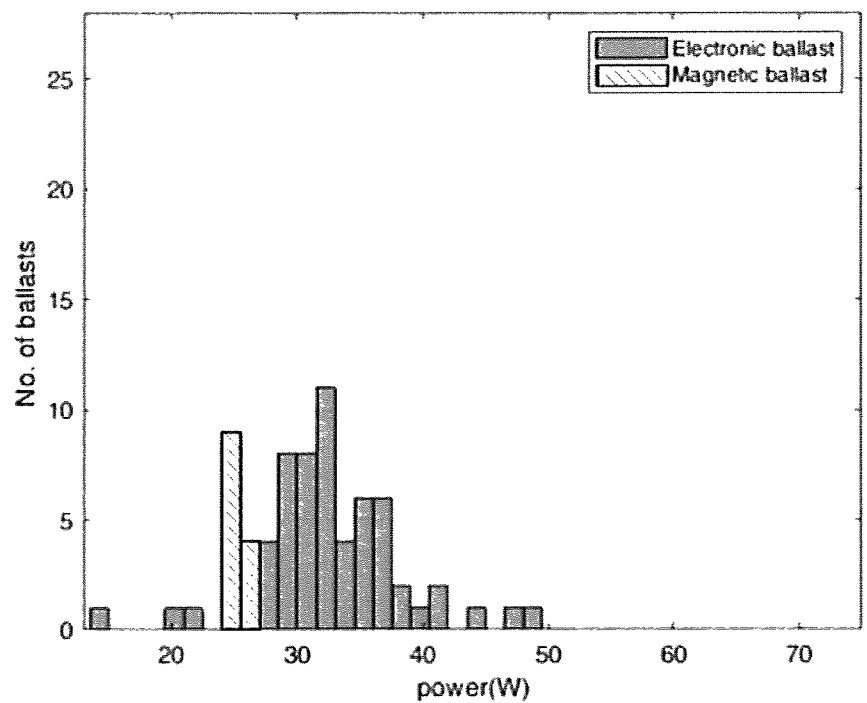
FIG. 1 is a graph of power output by a variety of ballasts when driving an exemplary conventional LED lamp.

The embodiments described herein provide a means to regulate power used by the LED lamp 1. For example, conventional LED lamps on the market exhibit a wide variation in lamp power spread from 24 W-50 W when driven by differing type of ballasts, as shown in FIG. 1, whereas with embodiment described herein can achieve a substantial reduction in variation of lamp power.

The first switch 21, second switch 31, and third switch 35, may each be implemented as an electromechanical relay or semiconductor switch such as a transistor or MOSFET or the like. In this disclosure the terms "open" and "close" encompass on/off switching such as produced by an electromechanical relay, or turning off and turning on of a transistor or MOSFET or the like, i.e. variation between an "on" or connected state with relatively low impedance equivalent to a closed switch, to an "off" or disconnected state with relatively high impedance equivalent to an open switch. The first switch 21 switches at high frequency (at or above 300 kHz) and a semiconductor switch is preferred, for example a GaN switch to reduce the size the losses in the switch. The embodiments described above use only one high frequency switch, i.e. first switch 21, which reduces cost and makes it possible to use a simple circuit to achieve a satisfactory and practical power regulation circuit. The rectifier(s) 10, 10a, 10b may be a full wave rectifier, using diodes selected to reduce losses at high frequencies, for example SiC diodes.

It will be appreciated by the skilled person that the embodiments described herein all relate to an LED lamp assembly having means to regulate the lamp power, and features described in relation to one embodiment may be used with or combined with features of the other embodiments. While the principles of the invention have been set out above in connection with specific embodiments, it is to be understood that this description is merely made by way of example and not as a limitation of the scope of protection, which is determined by the appended claims.

The invention claimed is:

1. An LED lamp for use in a luminaire, the LED lamp comprising:
   a plurality of LEDs connected in a plurality of groups;
   one or more rectifier circuits adapted for rectifying an electrical current received from the luminaire for supply to the LEDs;
   a first control circuit adapted to estimate electrical current or electrical power received by or used by the LED lamp, and adapted to generate an output on the basis of the estimate; and
   a switching circuit comprising a first switch for switching the plurality of groups of LEDs between a plurality of different circuit configurations at a switching frequency of at least 300 kHz and according to a duty cycle;
   wherein the switching circuit is configured to adjust the duty cycle in dependence on the output of the first control circuit to adjust the electrical power used by the LED lamp.

2. The LED lamp according to claim 1, wherein the switching circuit is configured to adjust the duty cycle to substantially maintain a power output of the plurality of LEDs at a predetermined level.

3. The LED lamp according to claim 1, wherein the first control circuit comprises a microprocessor or microcontroller executing code for determining the output for adjusting the duty cycle.

4. The LED lamp according to claim 1, wherein the plurality of groups of LEDs includes a first group of LEDs and a second group of LEDs connected in series, and wherein the first switch is connected in parallel with the second group of LEDs.

5. The LED lamp according to claim 1, further comprising:
   an inductive element connected to receive an input electrical current from the luminaire for supply to the LEDs; and
   a second switch operable to bypass the inductive element in dependence on the received input current from the luminaire and a predetermined threshold.

6. The LED lamp according to claim 5, wherein the second switch is controlled by a second control circuit adapted to measure an electrical current received by LED lamp from the luminaire or electrical current flowing in the LED lamp, and control the second switch on the basis of the measurement.

7. The LED lamp according to claim 5, wherein the inductive element is connected to receive an electrical current from the luminaire before rectification.

8. The LED lamp according to claim 5, wherein the inductive element has an inductance in a range of 200 µH to 500 µH.

9. An LED lamp for use in a luminaire, the LED lamp comprising:
   a plurality of LEDs connected in a plurality of groups;
   one or more rectifier circuits adapted for rectifying an electrical current received from the luminaire for supply to the LEDs;
   a first control circuit adapted to estimate electrical current or electrical power received by or used by the LED lamp, and adapted to generate an output on the basis of the estimate;
   a switching circuit comprising a first switch for switching the plurality of groups of LEDs between a plurality of different circuit configurations at a switching frequency of at least 300 kHz and according to a duty cycle;
   a switched-mode power supply electrically connected to receive a rectified current from one or more of the rectifiers and generate a switched DC output current suitable for driving the LEDs; and
   a frequency detection circuit adapted to detect the frequency of a voltage or current supplied to LED lamp from the luminaire and generate an output, or a voltage detection circuit adapted to detect a voltage supplied to LED lamp from the luminaire;
   wherein the switching circuit is configured to adjust the duty cycle in dependence on the output of the first control circuit to adjust the electrical power used by the LED lamp,
   wherein the LED lamp is adapted to disconnect or disable or deactivate the switching circuit and connect or enable or activate the switched-mode power supply for driving the LEDs on the basis of the output of the frequency detection circuit or the voltage detection circuit.

10. The LED lamp according to claim 9, further comprising a third switch connected in series with one of the groups of LEDs, wherein the said group of LEDs is disconnected from the output of the rectifiers when third switch is open.

11. The LED lamp according to claim 10, wherein the third switch also disconnects the switching circuit from the output of the rectifiers when the third switch is open.

12. The LED lamp according to claim 1, wherein the LED lamp includes only one switch adapted to switch at a frequency of 300 kHz of higher.

13. The LED lamp according to claim 9, wherein the switching circuit is configured to adjust the duty cycle to substantially maintain a power output of the plurality of LEDs at a predetermined level.

14. The LED lamp according to claim 9, wherein the first control circuit comprises a microprocessor or microcontroller executing code for determining the output for adjusting the duty cycle.

15. The LED lamp according to claim 9, wherein the plurality of groups of LEDs includes a first group of LEDs and a second group of LEDs connected in series, and wherein the first switch is connected in parallel with the second group of LEDs.

16. The LED lamp according to claim 9, further comprising:
   an inductive element connected to receive an input electrical current from the luminaire for supply to the LEDs; and
   a second switch operable to bypass the inductive element in dependence on the received input current from the luminaire and a predetermined threshold.

17. The LED lamp according to claim 16, wherein the second switch is controlled by a second control circuit adapted to measure an electrical current received by LED lamp from the luminaire or electrical current flowing in the LED lamp, and control the second switch on the basis of the measurement.

18. The LED lamp according to claim 16, wherein the inductive element is connected to receive an electrical current from the luminaire before rectification.

19. The LED lamp according to claim 16, wherein the inductive element has an inductance in a range of 200 µH to 500 µH.

20. The LED lamp according to claim 9, wherein the LED lamp includes only one switch adapted to switch at a frequency of 300 kHz of higher.

21. An LED lamp for use in a luminaire, the LED lamp comprising:
- a plurality of LEDs connected in a plurality of groups;
- one or more rectifier circuits adapted for rectifying an electrical current received from the luminaire for supply to the LEDs;
- a first control circuit adapted to estimate electrical current or electrical power received by or used by the LED lamp, and adapted to generate an output on the basis of the estimate;
- a switching circuit comprising a first switch for switching the plurality of groups of LEDs between a plurality of different circuit configurations at a switching frequency and according to a duty cycle;
- a switched-mode power supply electrically connected to receive a rectified current from one or more of the rectifiers and generate a switched DC output current suitable for driving the LEDs; and
- a frequency detection circuit adapted to detect the frequency of a voltage or current supplied to LED lamp from the luminaire and generate an output, or a voltage detection circuit adapted to detect a voltage supplied to LED lamp from the luminaire;
- wherein the switching circuit is configured to adjust the duty cycle in dependence on the output of the first control circuit to adjust the electrical power used by the LED lamp,
- wherein the LED lamp is adapted to disconnect or disable or deactivate the switching circuit and connect or enable or activate the switched-mode power supply for driving the LEDs on the basis of the output of the frequency detection circuit or the voltage detection circuit.

22. The LED lamp according to claim 21, further comprising:
- an inductive element connected to receive an input electrical current from the luminaire for supply to the LEDs; and
- a second switch operable to bypass the inductive element in dependence on the received input current from the luminaire and a predetermined threshold,
- wherein the second switch is controlled by a second control circuit adapted to measure an electrical current received by LED lamp from the luminaire or electrical current flowing in the LED lamp, and control the second switch on the basis of the measurement.

23. The LED lamp according to claim 21, further comprising a third switch connected in series with one of the groups of LEDs, wherein the said group of LEDs is disconnected from the output of the rectifiers when third switch is open.

24. The LED lamp according to claim 23, wherein the third switch also disconnects the switching circuit from the output of the rectifiers when the third switch is open.

* * * * *